US012216423B2

(12) United States Patent
Hanazato et al.

(10) Patent No.: US 12,216,423 B2
(45) Date of Patent: Feb. 4, 2025

(54) IMAGE FORMING SYSTEM INCLUDING VARNISH IMAGE FORMING APPARATUS

(71) Applicant: CANON KABUSHIKI KAISHA, Tokyo (JP)

(72) Inventors: Taro Hanazato, Tokyo (JP); Yoshiro Tsukada, Chiba (JP); Masami Hano, Chiba (JP); Shingo Hirota, Ibaraki (JP); Toshiyuki Yamada, Tokyo (JP); Daisuke Katayama, Chiba (JP); Kyohei Kikuchi, Ibaraki (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 18/229,868

(22) Filed: Aug. 3, 2023

(65) Prior Publication Data

US 2024/0045360 A1 Feb. 8, 2024

(30) Foreign Application Priority Data

Aug. 5, 2022 (JP) ................................ 2022-125394

(51) Int. Cl.

| | |
|---|---|
| ***G03G 15/20*** | (2006.01) |
| ***B41F 23/04*** | (2006.01) |
| ***B41F 23/08*** | (2006.01) |
| ***G03G 15/00*** | (2006.01) |
| ***G03G 15/08*** | (2006.01) |

(52) U.S. Cl.

CPC ..... *G03G 15/2064* (2013.01); *B41F 23/0409* (2013.01); *B41F 23/08* (2013.01); *G03G 15/0863* (2013.01); *G03G 15/5062* (2013.01); *G03G 15/6552* (2013.01); *G03G 2215/047* (2013.01)

(58) Field of Classification Search

USPC ........................................................ 399/385

See application file for complete search history.

(56) References Cited

U.S. PATENT DOCUMENTS 10,277,756 B2 4/2019 Spence et al.

FOREIGN PATENT DOCUMENTS

| | | | | |
|---|---|---|---|---|
| JP | 2009149037 | A | * | 7/2009 |
| JP | 2019-59231 | A | | 4/2019 |
| JP | 2019-77065 | A | | 5/2019 |
| JP | 2019-111813 | A | | 7/2019 |
| JP | 2021-156844 | A | | 10/2021 |
| JP | 2021-173930 | A | | 11/2021 |

* cited by examiner

*Primary Examiner* — Quana Grainger
(74) *Attorney, Agent, or Firm* — Venable LLP

(57) ABSTRACT

An image forming system includes an image forming apparatus, a fixing device, a varnish image forming apparatus, an image reading portion, and a controller. The controller corrects first image data depending on first detection image data of a toner image formed on a first recording material and read by the image reading portion, and then depending on the corrected first image data, a toner image is formed on a second recording material subsequent to the first recording material. The controller corrects second image data depending on second detection image data of a varnish image read by the image reading portion, and then depending on the corrected second image data, a varnish image is formed on the second recording material.

14 Claims, 12 Drawing Sheets

IMAGE FORMING SYSTEM INCLUDING VARNISH IMAGE FORMING APPARATUS

FIELD OF THE INVENTION AND RELATED ART

The present invention relates to an image forming system including an image forming apparatus for forming a toner image on a recording material, a varnish applying apparatus capable of forming a varnish image on the recording material, and an image inspection apparatus for inspecting positional deviation of the toner image and the varnish image.

Recently, for the purpose of gloss impartment, surface protection, decoration, and the like, surface processing such that a toner image is formed as a background image with a developer on a recording material and then a varnish image is formed on the recording material on which the toner image is formed is carried out. Herein, the toner image on which the varnish image is superposed is referred to as the background image. As an apparatus for forming the varnish image on the recording material, for example, a varnish applying apparatus (referred to as a varnish coater) is used. The varnish coater partially applies varnish onto the recording material and is capable of forming the varnish image superposedly on the toner image which is the background image (Japanese Laid-Open Patent Application (JP-A) 2019-111813).

Further, conventionally, an image inspection apparatus for inspecting positional deviation of a toner image actually formed on a recording material by an image forming apparatus and a varnish image actually formed on the recording material by the varnish coater is proposed (JP-A 2021-156844). The image forming apparatus and the varnish coater form the toner image and the varnish image, respectively, on the basis of data on the toner image and data on the varnish image which are included in inputted image data. In JP-A 2021-156844, in the case where positional deviation occurs in the toner image and the varnish image which are actually formed on the recording material, correction of each of a toner image forming position and a varnish image forming position made on the basis of the inputted image data is disclosed.

Incidentally, in the case where the toner image is formed on the recording material and then the varnish image is formed superposedly on the toner image, "magnification deviation" such that a toner image of the image data and the toner image formed on the recording material change in size may occur. In addition, "movement deviation" such that the toner image and the varnish image shift in at least one of a recording material feeding direction and a widthwise direction crossing the recording material feeding direction may occur. When such deviation occurs, there was a possibility that positions of the toner image and the varnish image shift on the recording material.

SUMMARY OF THE INVENTION

According to an aspect of the present invention, there is provided an image forming system comprising: an image forming apparatus configured to form a toner image on a first recording material on the basis of first image data on the toner image; a fixing device configured to fix the toner image on the first recording material by applying heat and pressure to the first recording material on which the toner image is formed by the image forming apparatus; a varnish image forming apparatus configured to form a varnish image on the first recording material, on which the toner image is fixed by the fixing device, on the basis of second image data on the varnish image; an image reading portion configured to read the toner image and the varnish image which are formed on the first recording material; and a controller configured to control the image forming apparatus and the varnish image forming apparatus, wherein the controller corrects the first image data depending on first detection image data on the toner image read by the image reading portion, and then depending on the corrected first image data, a toner image is formed on a second recording material subsequent to the first recording material, and wherein the controller corrects the second image data depending on second detection image data on the varnish image read by the image reading portion, and then depending on the corrected second image data, a varnish image is formed on the second recording material.

Further features of the present invention will become apparent from the following description of exemplary embodiments with reference to the attached drawings.

Figure 5:
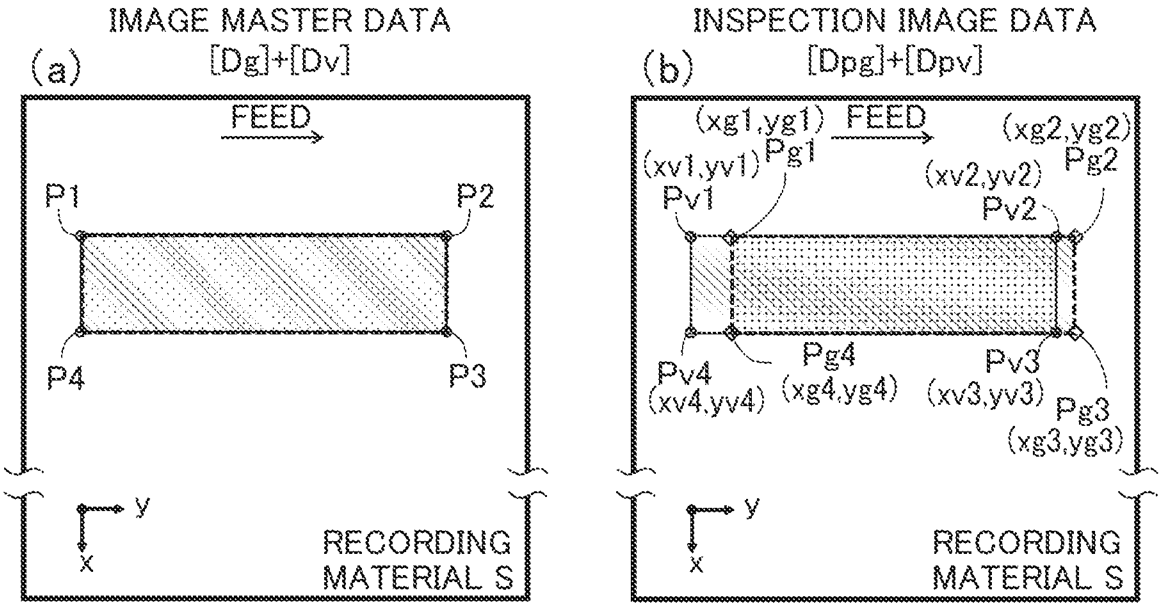

Part (a) of FIG. 5 is a schematic view showing a position reference point on image master data, and part (b) of FIG. 5 is a schematic view showing a position reference point on inspection image data.

Figure 6:
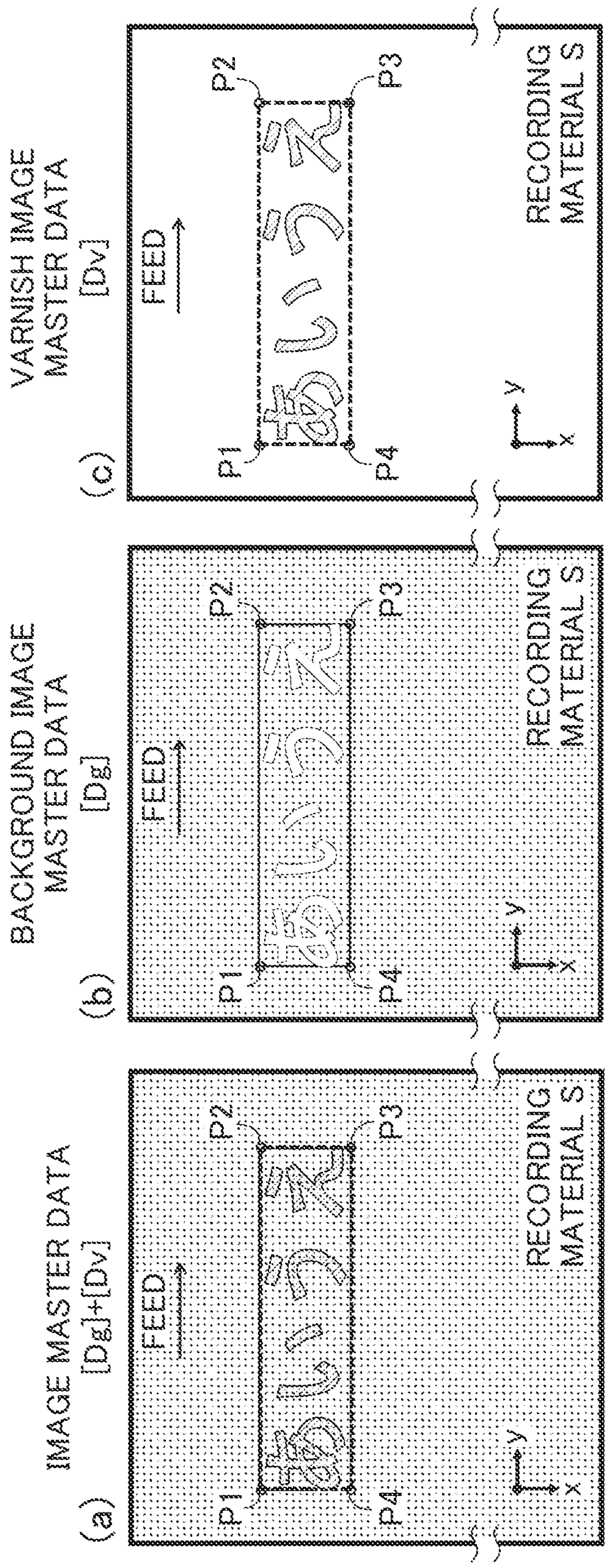

Parts (a) to (c) of FIG. 6 are schematic views each showing a position reference point of character information on image master data, part (a) shows background image master data [Dg] and varnish image master data [Dv], part (b) shows the background image master data [Dg], and part (c) shows the varnish image master data [Dv].

Figure 7:
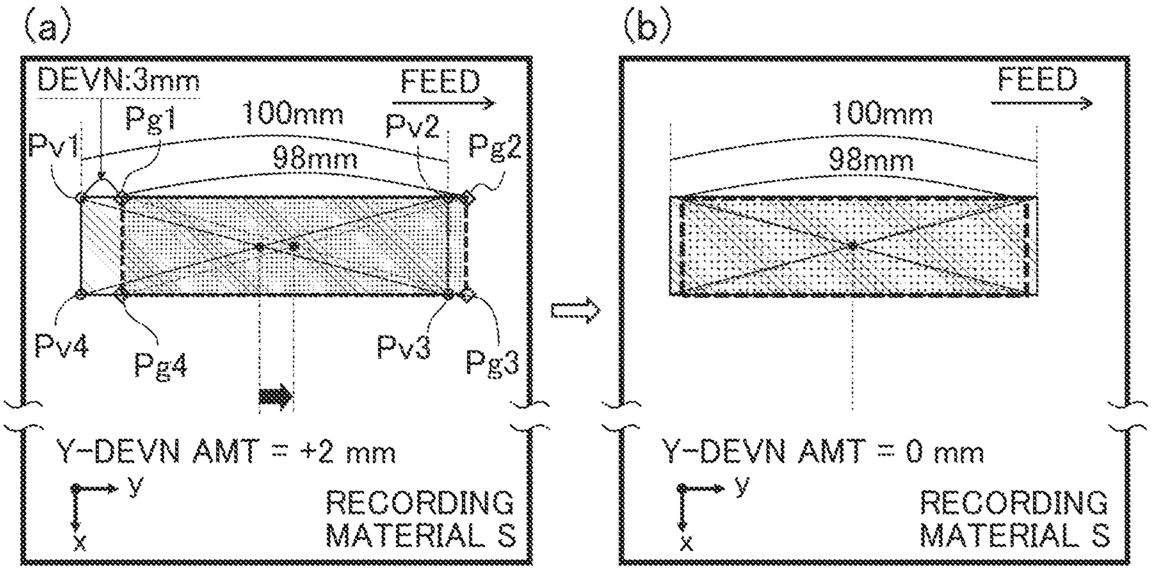

Part (a) of FIG. 7 is a schematic view for illustrating calculation of a movement deviation amount on the inspection image data, and part (b) of FIG. 7 is a schematic view for illustrating correction of the movement deviation amount on the inspection image data.

Figure 8:
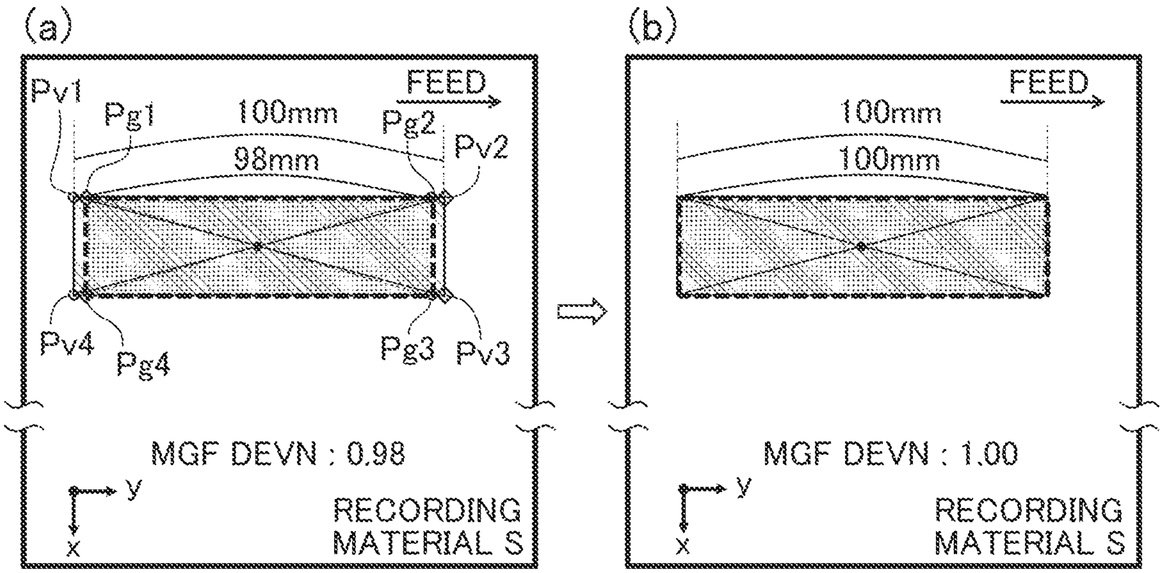

Part (a) of FIG. 8 is a schematic view for illustrating calculation of a magnification deviation amount on the inspection image data, and part (b) of FIG. 8 is a schematic view for illustrating correction of the magnification deviation amount on the inspection image data.

Figure 9:
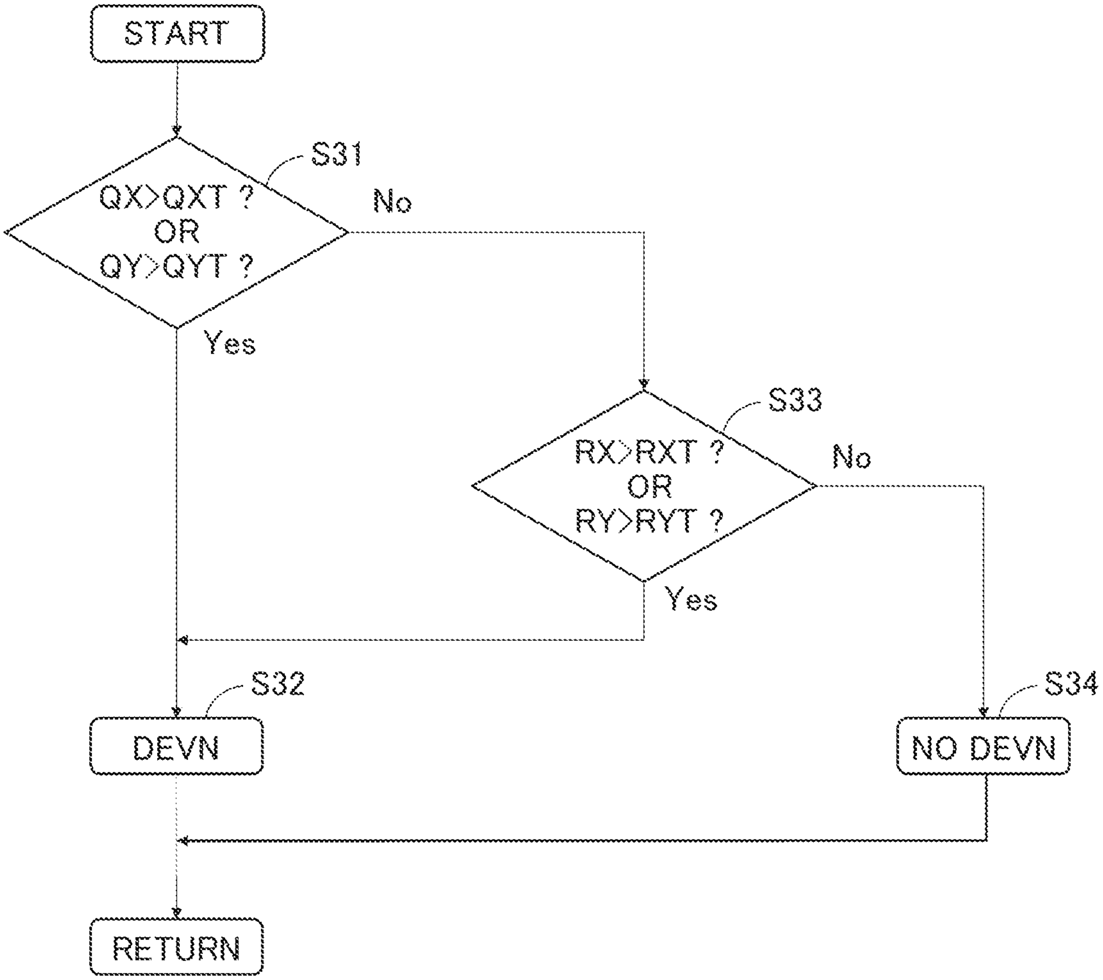

FIG. 9 is a flowchart showing discriminating processing.

Figure 10:
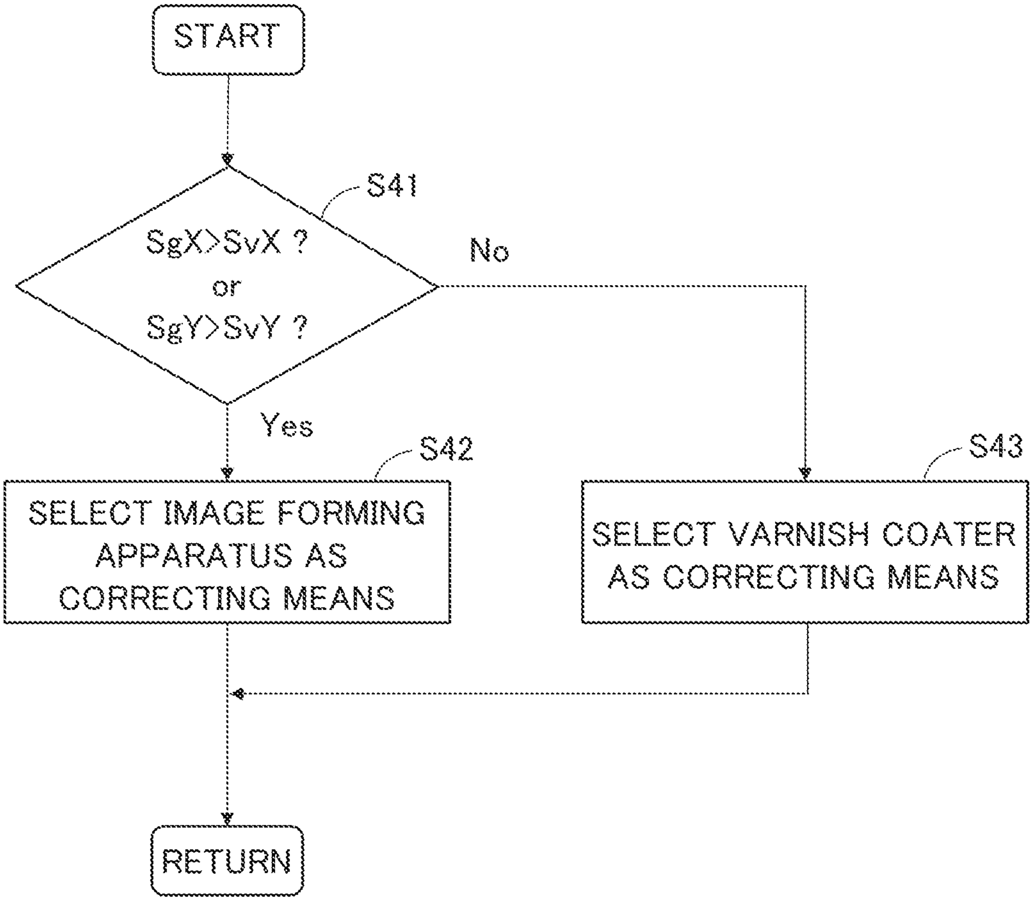

FIG. 10 is a flowchart showing correcting means determining processing.

Figure 11:
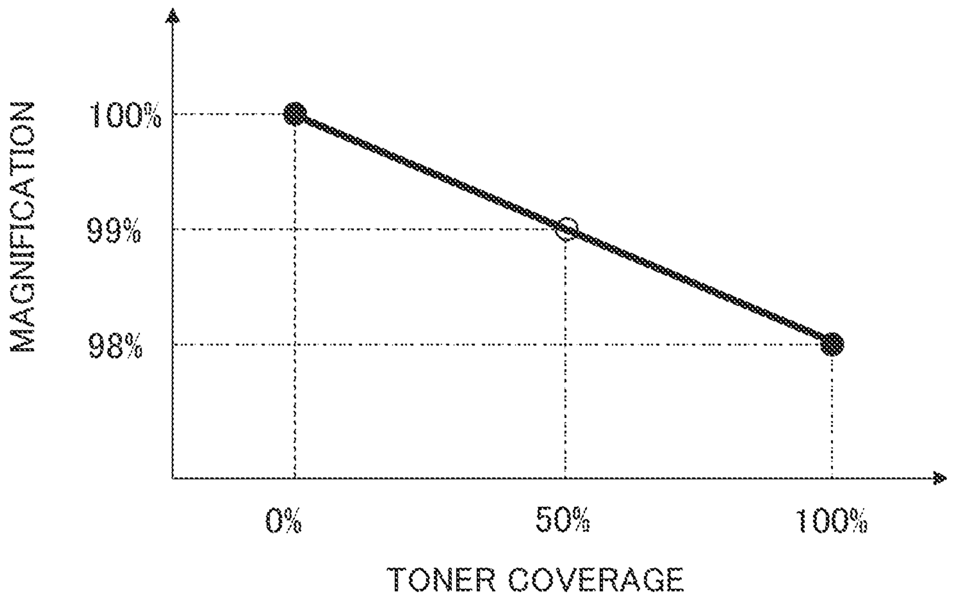

FIG. 11 is a graph showing a fluctuation in magnification relative to toner coverage with respect to a recording material feeding direction.

Figure 12:
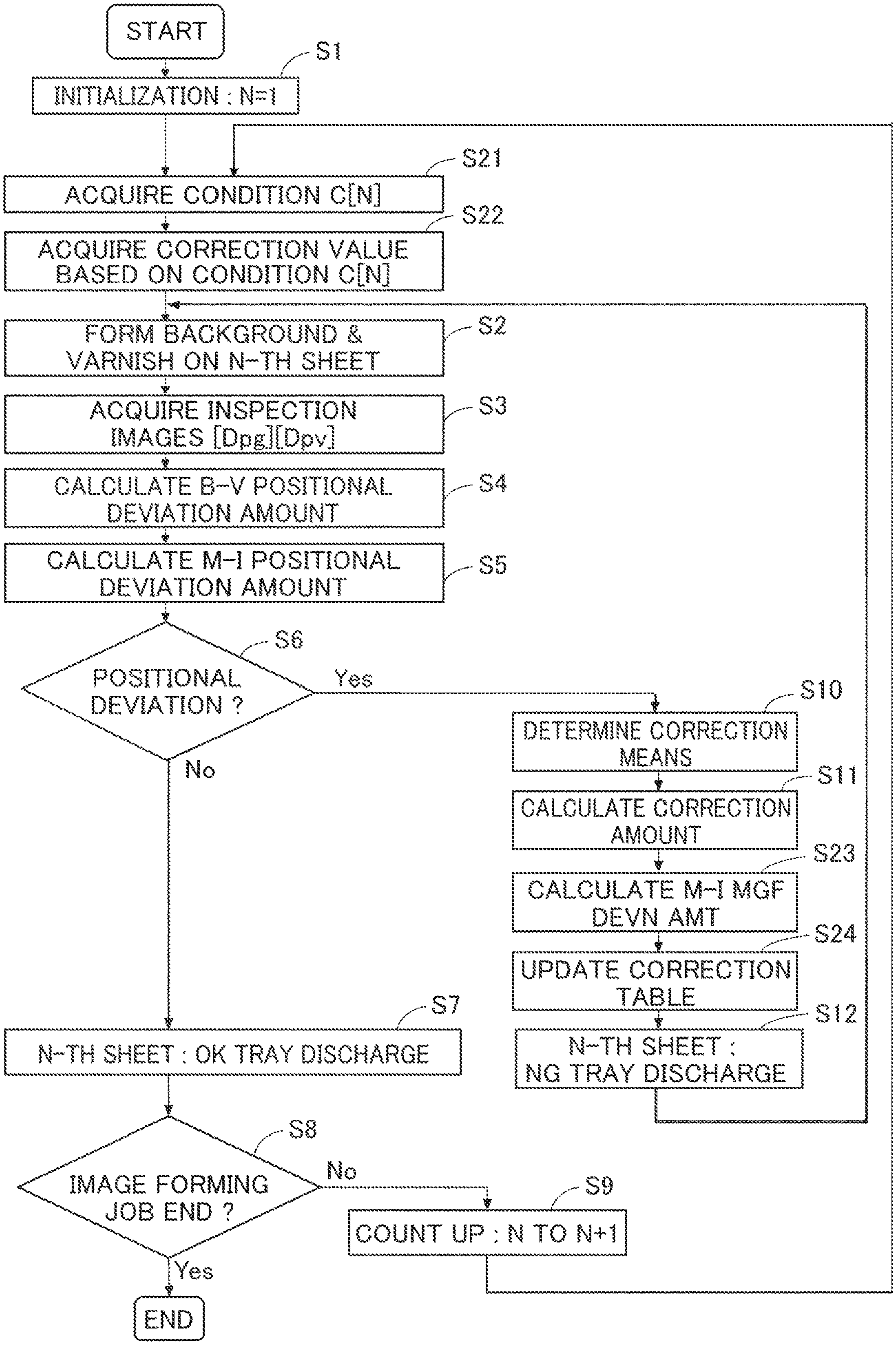

FIG. 12 is a flowchart showing recording material output processing in a second embodiment.

DESCRIPTION OF THE EMBODIMENTS

First Embodiment

Figure 1:
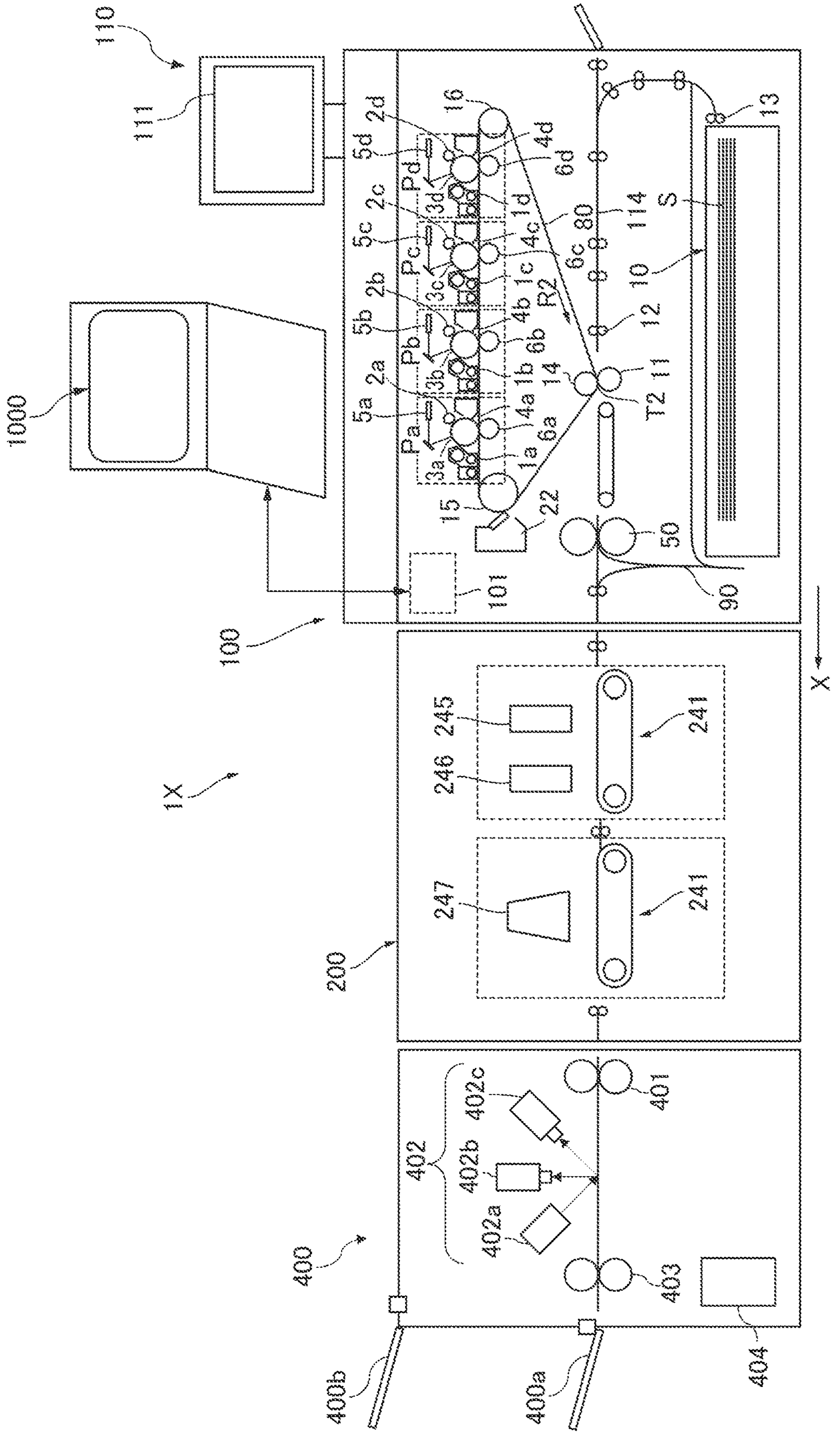
FIG. 1 is a schematic view showing a structure of an image forming system.

First, an image forming system 1X of this embodiment will be described using FIG. 1. The image forming system 1X shown in FIG. 1 includes an image forming apparatus 100 for forming a toner image on a recording material S, a varnish applying apparatus 200 (referred to as a varnish coater) for forming a varnish image on the recording material S, and an image inspection apparatus 400 for inspecting the toner image and the varnish image which are formed on the recording material S. The varnish coater 200 and the image inspection apparatus 400 are post-step units each retrofittable to the image forming apparatus 100 for expanding function. The image forming apparatus 100 and the varnish coater 200, and the varnish coater 200 and the image inspection apparatus 400 are, respectively, connected to each other so as to be capable of delivering the recording material S therebetween. The image forming apparatus 100, the varnish coater 200, and the image inspection apparatus 400 are connected to each other by data input/output interfaces (not shown) so as to be capable of sending and receiving control signals and data therebetween. Incidentally, the image forming apparatus 100, the varnish coater 200, and the image inspection apparatus 400 are not required to be separate members, but may also be integrally constituted with each other.

The recording material S on which the toner image is formed by the image forming apparatus 100 is conveyed to the varnish coater 200 for the purpose of improving glossiness, water resistance, friction resistance, and the like of the toner image, so that the varnish image is capable of being formed superposedly on the toner image which is the background image by the varnish coater 200. Thereafter, the recording material S on which the varnish image is formed by the varnish coater 200 is conveyed toward the image inspection apparatus 400, and is subjected to inspection of positional deviation in the toner image and the varnish image by the image inspection apparatus 400. Incidentally, as the recording material S, it is possible to cite sheet materials such as plain paper, thick paper, rough paper, uneven paper, coated paper, and the like.

<Image Forming Apparatus>

The image forming apparatus 100 will be described. The image forming apparatus 100 is an electrophotographic full-color printer of a tandem type. The image forming apparatus 100 forms the toner image on the recording material S on the basis of background image master data (described later). The image forming apparatus 100 includes image forming portions Pa, Pb, Pc, and Pd for forming images of yellow, magenta, cyan, and black, respectively.

A feeding (conveying) process of the recording material S in the image forming apparatus 100 will be described. The recording materials S are accommodated in a cassette 10 in a stacked form, and each recording material S is sent from the cassette 10 in synchronism with an image forming timing by a supplying roller 13. The recording material S sent by the supplying roller 13 is conveyed toward a registration roller pair 12 provided in the course of a feeding (conveying) path 114. Then, the recording material S is subjected to oblique movement correction or timing correction by the registration roller pair 12, and thereafter, is sent to a secondary transfer portion T2. The secondary transfer portion T2 is a transfer nip formed by an inner secondary transfer roller 14 and an outer secondary transfer roller 11, and the toner image is transferred onto the recording material S in response to application of a secondary transfer voltage to the outer secondary transfer roller 11.

As regards the recording material S feeding process to the above-described secondary transfer portion T2, an image forming process of the image sent to the secondary transfer portion T2 at a similar timing will be described. First, although the image forming portions will be described, the respective color image forming portions Pa, Pb, Pc and Pd are constituted substantially similar to each other except that colors of toners used in developing devices 1*a*, 1*b*, 1*c* and 1*d* are yellow (Y), magenta (M), cyan (C), and black (K), respectively, which are different from each other. Therefore, in the following, as a representative, the image forming portion Pd for black will be described, and other image forming portions Pa, Pb and Pc will be omitted from description.

The image forming portion Pd is principally constituted by the developing device 1*d*, a charging device 2*d*, a photosensitive drum 3*d*, a photosensitive drum cleaner 4*d*, an exposure device 5*d*, and the like. A surface of a rotating photosensitive drum 3*d* is electrically charged uniformly in advance by the charging device 2*d*, and thereafter, an electrostatic latent image is formed by the exposure device 5*d* driven on the basis of a signal of image information. Then, the electrostatic latent image formed on the photosensitive drum 3*d* is developed into a toner image with use of a developer by the developing device 1*d*. Then, the toner image formed on the photosensitive drum 3*d* is primary-transferred onto an intermediary transfer belt 80 in response to application of a primary transfer voltage to a primary transfer roller 6*d* disposed opposed to the image forming portion Pd while sandwiching the intermediary transfer belt 80 therebetween. Primary transfer residual toner slightly remaining on the photosensitive drum 3*d* is collected by the photosensitive drum cleaner 4*d*.

The intermediary transfer belt 80 is stretched by the inner secondary transfer roller 14, and stretching rollers 15 and 16, and is driven in an arrow R2 direction. In the case of this embodiment, the stretching roller 16 also functions as a driving roller for driving the intermediary transfer belt 80. The respective color image forming processes processed in parallel by the image forming portions Pa to Pd are carried out at timings each when the associated toner image is superposedly transferred onto the upstream toner image primarily transferred onto the intermediary transfer belt 80. As a result, finally, a full-color toner image is formed on the intermediary transfer belt 80 and is conveyed to the secondary transfer portion T2. Incidentally, secondary transfer residual toner after passing through the secondary transfer portion T2 is removed from the intermediary transfer belt 80 by a transfer cleaner 22.

In the above, by the above-described feeding process and the above-described image forming process, in the secondary transfer portion T2, the timing of the recording material S and the timing of the full-color toner image coincide with each other, so that secondary transfer is carried out. Thereafter, the recording material S is conveyed to a fixing device 50, in which heat and pressure are applied to the recording material S, so that the toner image is fixed on the recording material S. The fixing device 50 nips and feeds the recording material S on which the toner image is formed, and applies heat and pressure to the fed recording material S, so that the fixing device 50 fixes the toner image on the recording material S. That is, the toner of the toner image formed on the recording material S is melted and mixed, and is fixed as the full-color image on the recording material S.

The image forming apparatus 100 is capable of printing images on double (both) sides of the recording material S. In an operation in one-side printing mode, the recording material S on which the toner image is fixed on one (surface) side by the fixing device 50 is conveyed to the varnish coater 200. In an operation in double-side printing mode, the recording material S on which the toner image is fixed on one (surface) side by the fixing device 50 is conveyed to a double-side feeding portion 90. In the double-side feeding portion 90, the recording material S is reversed while being fed, so that a front surface (first surface) and a back surface (second surface) of the recording material S are switched. The reversed recording material S is re-fed toward the registration roller pair 12 through the double-side feeding portion 90. Then, the recording material S is fed by the registration roller pair 12 toward the secondary transfer portion T2 in a state in which the back surface side (second surface side) where the image is not printed is directed toward the intermediary transfer belt 80 side. In the secondary transfer portion T2, the toner images for the full-color image formed on the intermediary transfer belt 80 are secondary-transferred collectively onto the back surface side of the recording material S. Thereafter, the toner images are fixed on the recording material S by the fixing device 50, and then the recording material S on which the toner images are fixed is conveyed to the varnish coater 200.

<Developer>

In this embodiment, a two-component developer containing the toner and a carrier is used. The toner contains a binder resin, a colorant, and a parting agent (wax). As the binder resin, a known binder resin can be used. For example, it is possible to use resin materials such as a vinyl copolymer represented by a styrene-(meth)acrylic copolymer, a polyester resin, a hybrid resin obtained by chemically bonding a vinyl copolymer unit and a polyester unit to each other, an epoxy resin, a styrene-butadiene copolymer, and the like. As the colorant, it is possible to use known colorants for yellow (Y), magenta (M), cyan (C), and black (K), respectively.

As the parting agent, for example, it is possible to cite aliphatic hydrocarbon waxes such as low-molecular weight polyethylene, low-molecular weight olefin copolymer wax, microcrystalline wax, Fischer-Tropsch wax, and paraffin wax; oxide of the aliphatic hydrocarbon wax such as oxidized polyethylene wax; their block copolymers; waxes principally containing fatty acid esters such as carnauba wax and montanic acid ester wax; ester wax which is synthetic reaction product between higher aliphatic acid, such as behenyl behenate or behenyl stearate, and higher alcohol; fatty acid esters a part or all of which is deoxidized, such as deoxidized carnauba wax; and the like.

<Varnish Coater>

Figure 2:
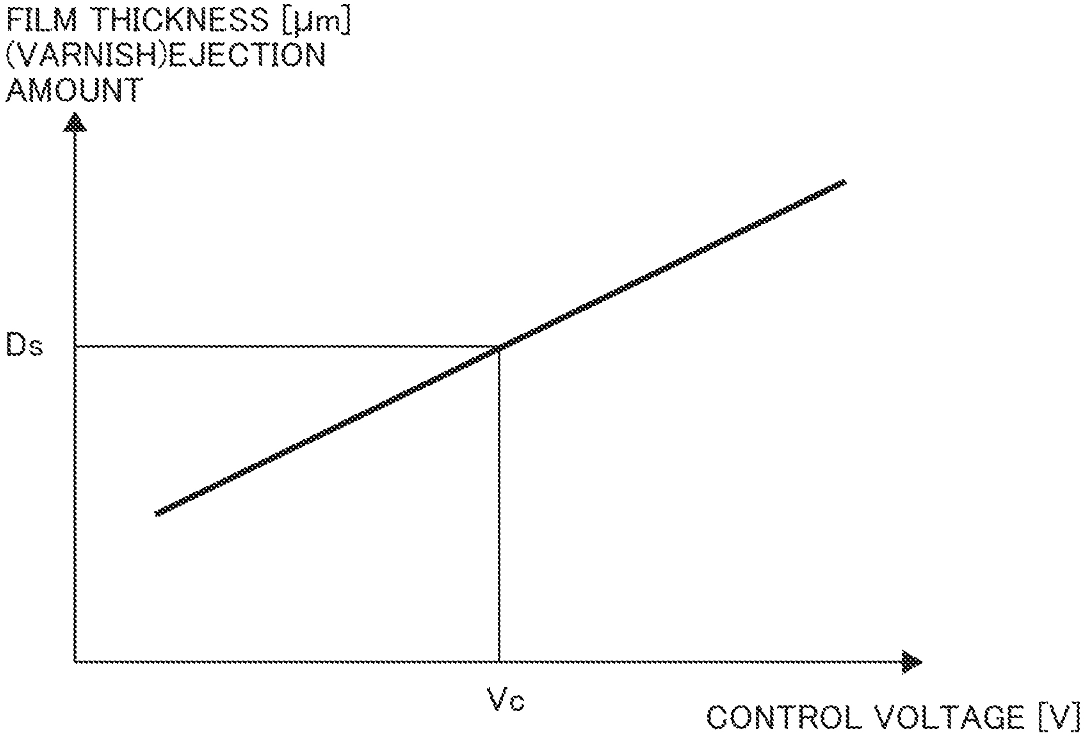
FIG. 2 is a graph showing a relationship between a control voltage and a film thickness which relate to varnish image formation.

Next, the varnish coater 200 will be described using FIGS. 1 and 2. The varnish coater 200 is an apparatus for forming the varnish image on the recording material S on the basis of varnish image master data (described later). In the case where the varnish coater 200 is of an ink jet type, separately from the toner images, varnish images such as characters, diagrams, graphics, and the like, which are desired by users, are formed by ejecting varnish in the form of droplets toward the recording material S and by causing the varnish to be deposited on the recording material S. Incidentally, as the varnish, various varnishes such as an aqueous varnish, an oil varnish, and a UV varnish may be used, and in the following, the varnish coater 200 for forming a varnish image with the UV varnish, such as an ultraviolet-curable type, solidified by UV irradiation will be described as an example.

The varnish coater 200 includes a sheet feeding portion 241, a position detecting portion 245, a varnish ejecting portion 246, and a varnish solidifying portion 247. The sheet feeding portion 241 feeds the recording material S while attracting the recording material S to a belt feeding surface by an air sucking device (not shown) through holes formed in a feeding belt. Along a sheet feeding passage of this sheet feeding portion 241, in an order from an upstream side toward a downstream side of a feeding direction (arrow X direction) of the recording material S, the position detecting portion 245, the varnish ejecting portion 246, and the varnish solidifying portion 247 are disposed. The position detecting portion 245 is a detecting portion using a CCD, or the like, for example, and with respect to the recording material S fed while being sucked on the belt feeding surface, the position detecting portion 245 is capable of detecting each of a position of a leading end of the recording material S with respect to the feeding direction, and a position of each of opposite end portions with respect to a widthwise direction crossing the feeding direction of the recording material S.

The varnish ejecting portion 246 forms the varnish image on the recording material S by ejecting the UV varnish onto one surface (side) of the recording material S fed by the sheet feeding portion 241. The varnish ejecting portion 246 includes a plurality of print heads (not shown). The print heads are, for example, heads of a line type, in which a plurality of ejection ports (not shown) are arranged and disposed in the widthwise direction crossing the feeding direction of the recording material S so as to extend over a range covering a maximum width of the recording material S on which the image is capable of being formed by the varnish coater 200. A varnish ejecting method of the print heads may employ a type using heat generating elements, a type using piezo electric elements, a type using electrostatic elements, a type using MEMS elements, and the like. Although illustration is omitted, the UV varnish is supplied from a tank to the associated one of the print heads through a tube.

A film thickness of the varnish image is influenced by an application amount per unit area of the UV varnish onto the recording material S. The varnish application amount can be changed by adjusting a varnish ejecting amount from the print heads. For example, in the case of the type using the piezoelectric elements, as shown in FIG. 2, the varnish ejection amount varies depending on adjustment of a control voltage, and the film thickness of the varnish image is adjusted depending on an increase and a decrease in varnish ejection amount per unit area. In the case of this embodiment, the film thickness of the varnish image is adjusted in a range of, for example, "5-100 μm", preferably "10-70 μm".

Further, a resolution of the varnish image capable of being formed by the varnish coater 200 is, for example, "600 dpi", and in that case, the line width of the varnish image is adjusted in a "600 dpi" unit. Incidentally, the above-described range of the film thickness of the varnish image, the resolution of the varnish image, and an adjusting range of the line width of the varnish image may be appropriately changed depending on the varnish ejecting method of the print heads, a kind of the varnish, and the like.

Returning to FIG. 1, the recording material S on which the varnish image is formed on one surface thereof by the varnish ejecting portion 246 is sent by the sheet feeding portion 241 to the varnish solidifying portion 247 positioned downstream of the varnish ejecting portion 246 with respect to the feeding direction, and then the UV varnish on the recording material S is solidified by the varnish solidifying portion 247. The varnish solidifying portion 247 includes a UV lamp, and the UV lamp irradiates the UV varnish with UV radiation (UV rays) of a wavelength corresponding to the UV varnish. The UV lamp is disposed in an almost entire region of the recording material S with respect to the widthwise direction so as to be capable of emitting the UV light (UV radiation), and is turned on only during passing of the recording material S. As described above, the varnish image is capable of being overprinted superposedly on the toner image formed on the recording material S. Thereafter, the recording material S is conveyed to the image inspection apparatus 400.

<Image Inspection Apparatus>

Next, the image inspection apparatus 400 will be described. The image inspection apparatus 400 is an apparatus for inspecting the toner image and the varnish image which are formed on the recording material S. As shown in FIG. 1, the image inspection apparatus 400 includes a feeding roller 401, an image reading portion 402, a carrying-out roller 403, an image analyzing portion 404, and a controller (not shown) for controlling drive of these portions. These portions are driven on the basis of information from the main controller 101 included in the image forming apparatus 100, so that the image inspection apparatus 400 is capable of inspecting the toner image and the varnish image which are formed on the recording material S.

The feeding roller 401 feeds the recording material S, discharged from the varnish coater 200, into the image inspection apparatus 400. The image reading portion 402 reads, as an inspection image, the toner image and the varnish image which are formed on the recording material S, and includes a light irradiation device 402*a*, a diffused light detecting device 402*b*, and a regular reflection light detecting device 402*c*. The light irradiation device 402*a* irradiates the surface of the recording material S, fed by the feeding roller 401, with detection light such a white light over the widthwise direction crossing the feeding direction.

The diffused light detecting device 402*b* detects diffused light diffused and reflected from the surface of the recording material S in response to irradiation of the recording material surface with detection light from the light irradiation device 402*a*. For example, as the diffused light detecting device 402*b*, a line sensor is used. Then, the detected diffused light is converted into an electric signal and is sent as diffused light image data [Dh1] to the image analyzing portion 404. The regular reflection light detecting device 402*c* detects regular reflection light regularly reflected from the surface of the recording material S in response to irradiation of the recording material surface with the detection light from the light irradiation device 402*a*. For example, as the regular reflection light detecting device 402*c*, a line sensor is used. Then, the detected regular reflection light is converted into an electric signal and is sent as regular reflection light image data [Dh2] to the image analyzing portion 404. Incidentally, the image inspection apparatus 400 may only be required to be provided with at least one of the diffused light detecting device 402*b* and the regular reflection light detecting device 402*c*, but in this embodiment, the case where both the devices 402*b* and 402*c* are provided was cited as an example.

The carrying-out roller 403 discharges the recording material S, fed by the feeding roller 401 and passed through the image reading portion 402, to an outside of the image inspection apparatus 400. The recording material S is capable of being discharged by the carrying-out roller 403 onto either one of an OK tray 400*a* or an NG tray 400*b* on the basis of a result of positional deviation by the image analyzing portion 404 (described later). For example, a recording material S on which positional deviation does not occur in the toner image and the varnish image is discharged on the OK tray as a second tray, and a recording material S on which positional deviation does not occur in the toner image and the varnish image is discharged on the NG tray 400*b* as a first tray. Each of the OK tray 400*a* and the NG tray 400*b* is capable of stacking a large number of sheets of the recording materials S.

Figure 3:
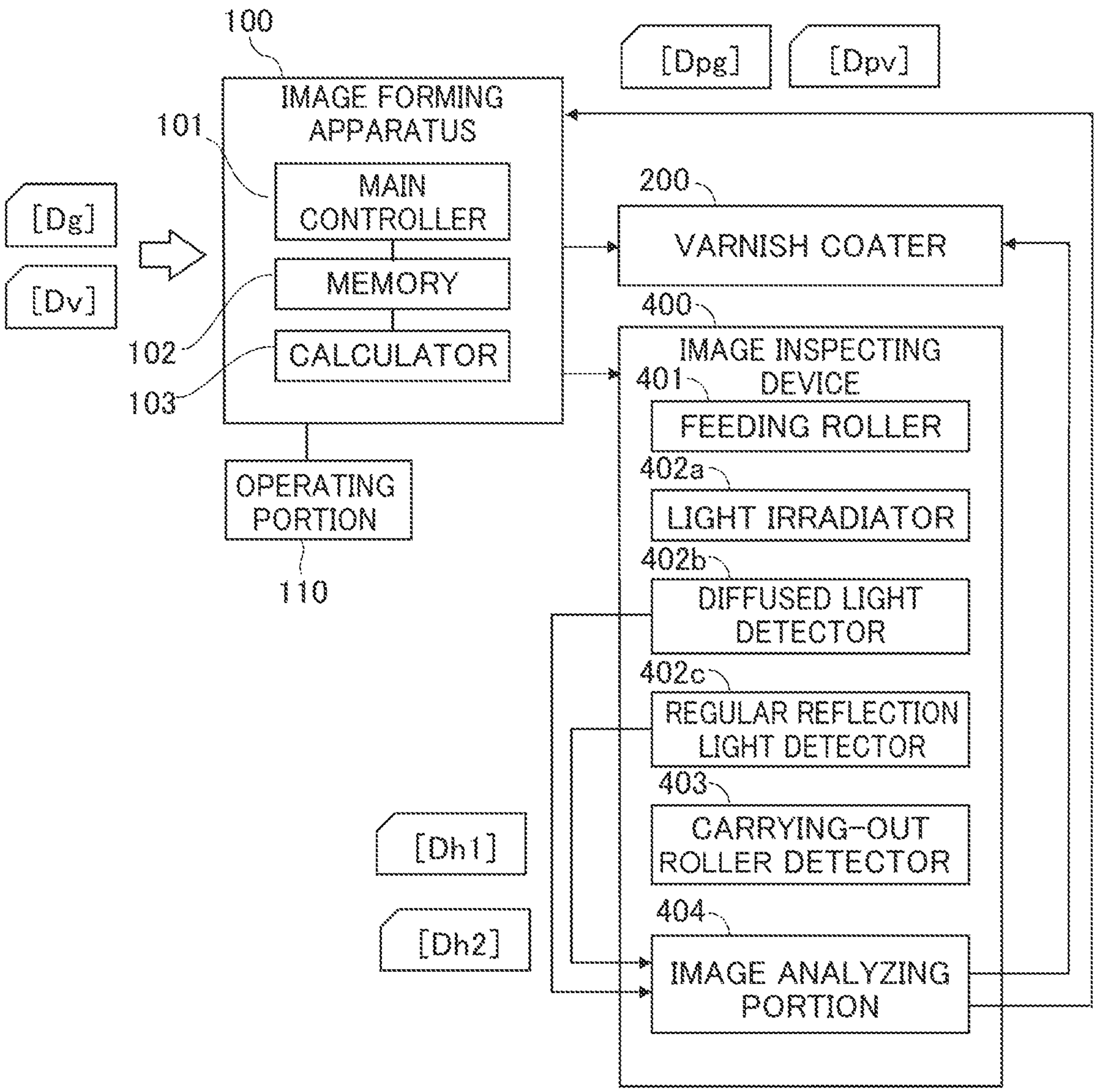
FIG. 3 is a control block diagram of an image formation control system in the image forming system.

Next, a control constitution of an image forming control system in the image forming system 1X will be described using FIG. 3 while making reference to FIG. 1. In this embodiment, an example in which the image forming apparatus 100 unitarily manages and controls operation instructions to the varnish coater 200 and the image inspection apparatus 400 (image inspecting device) will be described. Incidentally, to a main controller 101, in addition to the devices (portions) illustrated in FIG. 3, various devices may be connected, but are not the main object of the present invention herein, and therefore, will be omitted from illustration and description.

In the image forming system 1X of this embodiment, to the main controller 101, the operating portion 110, the varnish coater 200, and the image inspection apparatus 400 are connected so as to be capable of communicating operation instructions and various data. Thus, while the main controller 101 operates the image forming apparatus 100, the main controller 101 is capable of controlling entirety of the image forming system 1X by sending the operation instructions and the various data to the varnish coater 200 and the image inspection apparatus 400.

The main controller 101 includes a calculating portion 103 capable of calculating positional deviation of the toner image and the varnish image which are formed on the recording material S. Calculation of the positional deviation of the toner image and the varnish image will be described later. Further, the main controller 101 includes a CPU (central processing unit), and a memory 102 such as a ROM (read only memory), or a RAM (random access memory). In the memory 102 as a storing portion, various programs such as "recording material output processing" (see FIG. 14) and various data such as "a correction table" (see a table 1), which are described later, are stored. The CPU is capable of executing the various programs by using the various data stored in the memory 102. In the RAM, various data such as image master data received, for example, from an external device 1000 are stored. Further, the RAM is capable of temporarily storing a calculation (computation) processing result or the like with execution of the various programs. The image master data includes background image master data [Dg] as first image data and varnish image master data [Dv] as second image data.

The background image master data [Dg] and the varnish image master data [Dv] are data formed with, for example, graphic design software ("Adobe Illustrator (trademark)", and are sent from the external device 1000 via a network interface. The background image master data [Dg] is data on the toner image capable of being formed by the image forming apparatus 100, and the varnish image master data [Dv] is data on the varnish image capable of being formed by the varnish coater 200.

The main controller 101 is capable of executing processing such that the background image master data [Dg] and the varnish image master data [Dv] are changed to data capable of being processed by the image forming apparatus 100 and the varnish coater 200, respectively. Further, the main controller 101 is capable of executing various pieces of processing, such as toner image formation by the image forming apparatus 100, varnish image formation by the varnish coater 200, setting necessary for image inspection by the image inspection apparatus 400, and the like.

The background image master data [Dg] and the varnish image master data [Dv] includes information on relative positional relationship as forming positions of the toner image and the varnish image which are formed on the recording material S. Herein, the relative positional relationship is, for example, image information such that resolutions are the same value and is information such that a pixel of the background image master data [Dg] and a pixel of the varnish image master data [Dv] are in a one-to-one correspondence. This relative positional relationship is not only the one-to-one correspondence as image information, but also may be image information such that resolutions are different from each other and that includes margin information (for example, distance information from four sides of the recording material S) on an image forming position on the recording material S. In this case, the main controller 101 converts one of the background image master data [Dg] and the varnish image master data [Dv] into the resolution on the basis of a ratio of the resolutions of the background image master data [Dg] and the varnish image master data [Dv] and the margin information and carries out positional alignment on the basis of the margin information. By this, the pixel of the background image master data [Dg] and the pixel of the varnish image master data [Dv] are associated with each other in a one-to-one correspondence.

Further, the varnish image master data [Dv] includes information on the varnish in addition to the forming position of the varnish image. As the information on the varnish, it is possible to cite, for example, a kind and glossiness of the varnish, values of light intensity of diffused light diffusedly reflected in the case where the varnish is irradiated with the white light and light intensity of regular reflection light regularly reflected in the case where the varnish is irradiated with the white light, and the like. Incidentally, the varnish image master data [Dv] sent from the external device 1000 is not required to include the above-described information on the varnish, and in that case, the information on the varnish may only be required to be stored in advance in the varnish coater 200.

The image forming system 1X includes the operating portion 110 including, for example, a liquid crystal display portion 111, and the operating portion 110 is connected to the main controller 101. The operating portion 110 is, for example, a touch panel. On the liquid crystal display portion 111, various screens presenting the various programs and various data or the like can be displayed by the operating portion 110. Further, the operating portion 110 receives input of a start of the various programs and input of the various data, and the like, depending on a screen touch operation by a user. Incidentally, on the touch panel, a screen including various buttons, switches, and the like as software keys may be displayed.

The user is capable of inputting a start of an image forming job from the operating portion 110. In the case where the start of the image forming job is inputted, the main controller 101 executes the "recording material output processing" (see FIG. 5) stored in the memory 102. With this execution, the image forming apparatus 100 and the varnish coater 200 are operated, so that the toner image and the varnish image are formed on the recording material S. Further, the image inspection apparatus 400 is operated, so that image inspection of the toner image and the varnish image which are formed on the recording material S is performed.

The image inspection apparatus 400 includes the image analyzing portion 404 constituted by the CPU, the ROM, the RAM, and the like which are not shown. The image analyzing portion 404 acquires detection background image data [Dpg] and detection varnish image data [Dpv] diffused light image data [Dh1] detected by the diffused light detecting device 402*b* and regular reflection light image data [Dh2] detected by the regular reflection light detecting device 402*c*. The image analyzing portion 404 stores, as a reflected light table, values of light intensity of the diffused light and the regular reflection light for each of a kind of the varnish, a kind of the background image, and a kind of the recording material. The image analyzing portion 404 processes the diffused light image data [Dh1] and regular reflection light image data [Dh2] by making reference to a reflected light table to acquire the detection background image data [Dpg] and the detection varnish image data [Dpv]. Incidentally, in this embodiment, data by which the detected toner image is associated with a coordinate of an image forming region in the recording material S is referred to as the detection background image data [Dpg], and data by which the detected varnish image is associated with a coordinate of the image forming region in the recording material S is referred to as the detection varnish image data [Dpv].

Each of the detection background image data [Dpg] and the detection varnish image data [Dpv] is data by which the toner image (or the varnish image) is associated with the coordinate of the image forming region in the recording material S. For that reason, in the case where the resolution of the toner image and the resolution of the varnish image coincide with each other, a pixel position of the detection background image data [Dpg] and a pixel position of the detection varnish image data [Dpv] can be associated with each other. On the other hand, in the case where the resolution of the toner image and the resolution of the varnish image are different from each other, on the basis of a ratio between the detection background image data [Dpg] and the detection varnish image data [Dpv] and coordinate information on the image forming positions on the recording material S, one of the background image master data [Dg] and the varnish image master data [Dv] is converted into the resolution and then positioned alignment is carried out. By doing so, the pixel position of the detection background image data [Dpg] and the pixel position of the detection varnish image data are associated with each other.

<Movement Deviation>

In some cases, a situation such that a toner image caused "movement deviation" is formed on the recording material S is formed, for example, when the electrostatic latent image is formed on the photosensitive drum 3*d*, when the toner image is primary-transferred from the photosensitive drum 3*d* onto the intermediary transfer belt 80, or when the toner image is secondary-transferred from the intermediary transfer belt 80 onto the recording material S. The toner image caused the "movement deviation" is detected the detection background image data [Dpg] having a parallel movement component (translation component) shifted relative to the background image master data [Dg] in the feeding direction of the recording material S and a widthwise direction crossing the feeding direction.

On the other hand, in the varnish coater 200, for example, when the recording material S is fed in the sheet feeding portion 241, a situation that the varnish image caused the "movement deviation" is formed on the recording material S is formed in some cases. The varnish image caused the "movement deviation" is detected as the detection varnish image data [Dpv] having a parallel movement component relative to the varnish image master data [Dv].

<Magnification Deviation>

In the case where the recording material S during feeding causes slip in the secondary transfer portion 12 or is in a situation that contracts with heating by the fixing device 50, "magnification deviation" can occur in the toner image on the recording material S. This is because the toner image formed on the recording material S is capable of contracting with contraction of the recording material S itself by a decrease in water content of the recording material S due to heating by the fixing device 50. Thus, when on the toner image formed on the recording material S, the varnish image is formed by the varnish coater 200 while being in a state in which magnification deviation occurs relative to the background image master data [Dg], the "magnification deviation" such that the toner image and the varnish image shift capable of being caused to occur.

<Recording Material Output Processing>

Next, "recording material output processing" in the first embodiment will be described using FIGS. 4 to 10 while making reference to FIG. 3. The "recording material output processing" is started by the main controller 101 in synchronism with, for example, input of a start of an image forming job and is repeated until an end of the image forming job.

Figure 4:
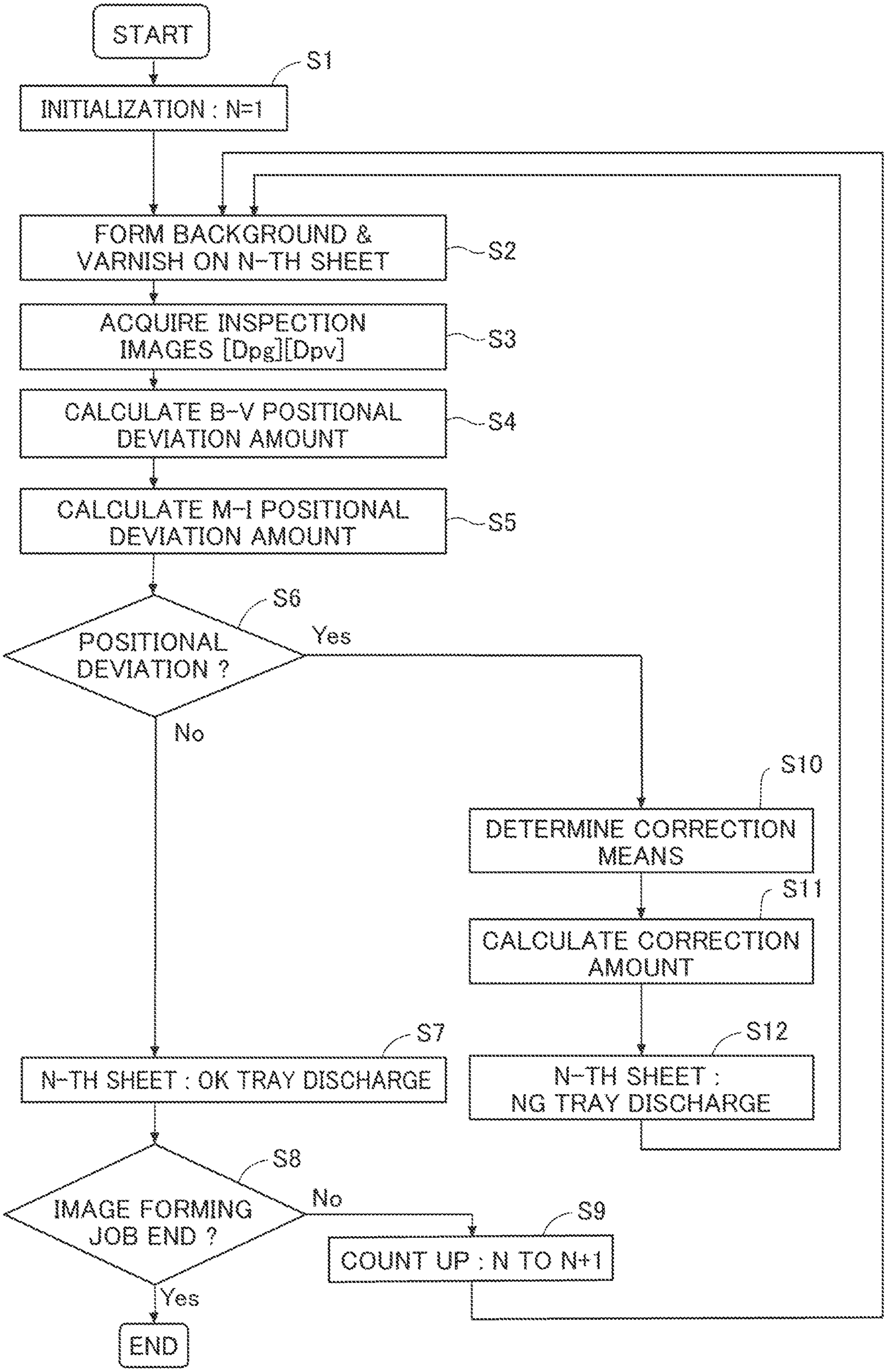
FIG. 4 is a flowchart showing recording material output processing in a first embodiment.

As shown in FIG. 4, every time when a single image forming job is started, the main controller 101 performs initialization such that an initial value "1" is set for a counter "N" for holding the number of sheets subjected to image formation during execution of the image forming job (S1). In the case of this embodiment, as described later, the number of sheets on which positional deviation does not occur between the toner image and the varnish image is counted and is held in the counter "N". Then, the main controller 101 acquires the background image master data [Dg] and the varnish image master data [Dv], and causes the image forming apparatus 100 to form the toner image on N-th recording material S and causes the varnish coater 200 to form the varnish image on the N-th recording material S (S2).

Incidentally, here, in the case of initial (first) image formation of the image on the N-th recording material S, the toner image and the varnish image are formed without correcting the background image master data [Dg] and the varnish image master data [Dv]. On the other hand, in the case of second image formation and later of the image on the N-th recording material S, the background image master data [Dg] and the varnish image master data [Dv] are corrected, and the toner image and the varnish image are formed.

The main controller 101 acquires the detection background image data [Dpg] and the detection varnish image data [Dpv] from the image inspection apparatus 400 (S3). From coordinate information on position reference point based on the acquired detection background image data [Dpg] and the acquired detection varnish image data [Dpv], the main controller 101 acquires each of a movement deviation amount and a magnification deviation amount, as a positional deviation amount of the toner image and the varnish image which are actually formed on the N-th recording material S.

<Positional Deviation Amount of Toner Image and Varnish Image>

A manner of acquiring the positional deviation amount of the toner image and the varnish image which are formed on the recording material S will be described. The main controller 101 sets a "position reference point" used for detecting positional deviation of the image in the background image master data [Dg] and the varnish image master data [Dv].

Setting of the position reference point is made, for example, by designation of an arbitrary toner image and an arbitrary varnish image from the operating portion 110 by the user. In an example shown in part (a) of FIG. 5, it is assumed that the toner image and the varnish image which have the same size and the same shape (rectangular shape) defined in the background image master data [Dg] and the varnish image master data [Dv] and which are formed superposedly in an entire region. Then, as shown in part (a) of FIG. 5, a rectangular region which is the designated toner image and the designated varnish image is specified, so that four points of points P1, P2, P3 and P4 which are apexes of this rectangular region are set as "position reference points".

Further, also, in the detection background image data [Dpg] and the detection varnish image data [Dpv] which are a detection result of the image inspection apparatus 400, "position reference points", corresponding to the points P1, P2, P3, and P4 which are the "position reference points" on each of the image master data shown in part (a) of FIG. 5 are set. Specifically, as shown in part (b) of FIG. 5, for example, the position reference points in the detection background image data [Dpg] are set at points Pg1, Pg2, Pg3, and Pg4, and the position reference points in the detection varnish image data [Dpv] are set at points Pv1, Pv2, Pv3, and Pv4. X-coordinates and Y-coordinates of these position reference points are as shown in part (b) of FIG. 5. Setting of the position reference points on each of the detection image data corresponding to the associated image master data is made on the basis of a predetermined algorism such as execution of corner detection in a designated region on the detection image data or execution of template matching between the image master data and the detection image data.

Another example of the setting of the position reference points will be described. For example, as shown in part (a) of FIG. 6, it is assumed that a varnish image formed a character information of "あいうえ" and a toner image formed as an image other than the character information of "あいうえ" which are defined as the background image master data [Dg] and the varnish image master data [Dv] are designated. That is, in the background image master data [Dg], the toner image which is the image other than the character information (i.e., the image excluding a white-blanking portion) shown in part (b) of FIG. 6 is defined, and in the varnish image master data [Dv], the varnish image of the character information shown in part (c) of FIG. 6 is defined.

In this case, depending on designation of the character information of "あいうえ" through the operating portion 110 or the external device 1000, the four apexes (P1, P2, P3, and P4) in a rectangular region specified so as to surround the designated character information are set at the "position reference points". Also, in the detection background image data [Dpg] and the detection varnish image data [Dpv], "position reference points" corresponding to the points P1, P2, P3 and P4 which are the "position reference points" on each information shown in part (a) of FIG. 6 are set.

After setting of the above-described "position reference points", the main controller 101 causes the calculating portion 103 to calculate positional deviation amounts between the toner image and the varnish image by comparing coordinates of the above-described position reference points with each other in the detection background image data [Dpg] and the detection varnish image data [Dpv].

A movement deviation amount QX of X-component of the varnish image relative to the toner image and a movement deviation amount QY of Y-component of the varnish image relative to the toner image are acquired by calculating the X-component and the Y-component of a difference of barycentric coordinates of the rectangular region constituting the position reference points of each of the detection varnish image data [Dpv] relative to the detection background image data [Dpg]. As shown in part (a) of FIG. 7, the movement deviation amounts QX and QY as third movement deviation are calculated by the following formulas (1) and (2), respectively.

$$QX=\{(xv1+xv2+xv3+xv4)/4\}-\{(xg1+xg2+xg3+xg4)/4\} \quad \text{formula (1)}$$

$$QY=\{(yv1+yv2+yv3+yv4)/4\}-\{(yg1+yg2+yg3+yg4)/4\} \quad \text{formula (2)}$$

On the other hand, the magnification deviation amount is a ratio of a length of a side on the detection background image data [Dpg] to a length of an associated side on the detection varnish image data [Dpv] as to two sides of the rectangular region constituting the four position reference points. As shown in part (a) of FIG. 8, a magnification deviation amount RX in X-direction and a magnification deviation amount RY in Y-direction are calculated by the following formulas (3) and (4), respectively.

$$RX=(xg4-xg1)/(xv4-xv1) \quad \text{formula (3)}$$

$$RY=(yg2-yg1)/(yv2-yv1) \quad \text{formula (4)}$$

<Positional Deviation Amount Between Image Master Data and Detection Image Data>

Returning to FIG. 4, the main controller 101 causes the calculating portion 103 to calculate a positional deviation amount between the image master data and the detection image data on the N-th recording material S (S5). A calculating method of the positional deviation amount between the image master data and the detection image data will be described.

A movement deviation amount SgX of X-component between the background image master data [Dg] and the detection background image data and a movement deviation amount SgY of Y-component between the background image master data [Dg] and the detection background image data are calculated by the following formulas (5) and (6), respectively. The movement deviation amounts SgX and SgY as first movement deviation correspond to a movement difference between center of gravity of the position reference points (P1, P2, P3, and P4) on the background image master data [Dg] and center of gravity of position reference points (Pg1, Pg2, Pg3, and Pg4) on the detection background image data.

$$SgX=\{(xg1+xg2+xg3+xg4)/4)\}-\{(x1+x2+x3+x4)/4\} \quad \text{formula (5)}$$

$$SgY=\{(yg1+yg2+yg3+yg4)/4\}-\{(y1+y2+y3+y4)/4\} \quad \text{formula (6)}$$

Further, a movement deviation amount SgX of X-component between the varnish image master data [Dv] and the detection varnish image data and a movement deviation amount SvY of Y-component between the varnish image master data [Dv] and the detection varnish image data are calculated by the following formulas (7) and (8), respectively. The movement deviation amounts SvX and SvY as second movement deviation correspond to a movement difference between center of gravity of the position reference points (P1, P2, P3, and P4) on the varnish image master data [Dv] and center of gravity of position reference points (Pv1, Pv2, Pv3, and Pv4) on the detection background image data.

$$SvX=\{(xv1+xv2+xv3+xv4)/4)\}-\{(x1+x2+x3+x4)/4\} \quad \text{formula (7)}$$

$$SvY=\{(yv1+yv2+yv3+yv4)/4)\}-\{(y1+y2+y3+y4)/4\} \quad \text{formula (8)}$$

<Discriminating Processing and Correcting Means Determining Processing>

Discrimination as to whether or not the positional deviation occurs between the toner image and the varnish image which are formed on the N-th recording material S is made in "discriminating processing" (described later) (S6). In the case where the positional deviation does not occur (No of S6), the main controller 101 causes the processing to jump to processing of a step S7. In the case where the positional deviation occurs (Yes of S6), the main controller 101 carries out "correcting means determining processing" (S10) (described later).

In FIG. 9, a flowchart of the "discriminating processing" (S6 of FIG. 8) is shown. As shown in FIG. 9, the main controller 101 discriminates whether or not the movement deviation amount QX is larger than a threshold QXT (first deviation amount) or the movement deviation amount QY is larger than a threshold QYT (first deviation amount) (S31). In the case where the movement deviation amount QY is larger than the threshold QXT or the movement deviation amount QY is larger than the threshold QYT (Yes of S31), the main controller 101 discriminates that the "positional deviation" (S32).

In the case where the movement deviation amount QX is not larger than the threshold QXT or the movement deviation amount QY is not larger than the threshold QYT (No of S31), the main controller 101 discriminates whether or not the magnification deviation amount RX in the X-direction is larger than a threshold RXT (second deviation amount) or the magnification deviation amount RY in the Y-direction is larger than a threshold RYT (second deviation amount) (S33). In the case where the magnification deviation amount RX is larger than the threshold RXT or the magnification deviation amount RY is larger than the threshold RYT (Yes of S33), the main controller 101 discriminates that the "positional deviation" occurs (S32). In the case where the magnification deviation amount RX is not larger than the threshold RXT or the magnification deviation amount RY is not larger than the threshold RYT (No of S33), the main controller 101 discriminates that the "positional deviation" does not occur (S34).

Incidentally, the above-described thresholds QXT, QYT, RXT, and RYT may be stored in advance in the image analyzing portion 404 or may also be appropriately inputted through the operating portion 110 by the user. Or, these thresholds may also be included in the background image master data [Dg] or the varnish image master data [Dv].

In FIG. 10, a flowchart of the correcting means determining processing (S10 of FIG. 4) is shown. As shown in FIG. 10, the main controller 101 discriminates whether or not a movement deviation amount SgX or SgY of the toner image (detection image) relative to the background image master data [Dg] is larger than an associated movement deviation amount SvX or SvY of the varnish image (detection image) relative to the varnish image master data [Dv] (S41). In the case where the movement deviation amount SgX or SgY of the toner image (detection image) is larger than the associated movement deviation amount SvX or SvY of the varnish image (detection image) (Yes of S41), the main controller 101 selects the image forming apparatus 100 as a movement deviation amount correcting means M (S42). On the other hand, in the case where the movement deviation amount SgX or SgY of the toner image (detection image) is not larger than the associated movement deviation amount SvX or SvY of the varnish image (detection image) (No of S41), the main controller 101 selects the varnish coater 200 as the movement deviation amount correcting means M (S43).

Thus, the main controller 101 selects the image forming apparatus 100 or the varnish coater 200 when an associated movement deviation of the position reference points on the detection image data relative to the position reference points on the image master data is larger and is selected as a movement deviation amount correcting object. That is, the movement deviation correction is made for eliminating the movement deviation in the toner image formation or in the varnish image formation. In this embodiment, the movement deviation correction is made by the image forming apparatus 100 or the varnish coater 200 of which movement deviation caused thereby is larger.

<Calculation of Correcting Amount>

Returning to the description of FIG. 4, the main controller 101 makes calculation of a correction amount (S11). The movement deviation amount correction is made by changing the image master data so that both the movement deviation amounts QX and QY calculated in the detection images become "0". In this embodiment, correction depending on a movement deviation correction amount is made by the apparatus selected in the step S10. In the case where the image forming apparatus 100 is selected for correcting the movement deviation, correction for moving the toner image in the X-direction by "-QX" and in the Y-direction by "-QY" is made by the image forming apparatus 100. That is, the image forming apparatus 100 forms the toner image by correcting the background image master data [Dg] with use of the movement deviation correction amount in subsequent image formation (re-printing of the image on the N-th sheet). By the control in this embodiment, relative to part (a) of FIG. 8, as shown in part (b) of FIG. 8, a state in which a gravity center position of the rectangular region constituting the position reference points of the toner image coincides with a gravity center position of the rectangular region constituting the position reference points of the varnish image is formed.

On the other hand, in the magnification deviation amount correction, magnification of the toner image of the background image master data [Dg] is made so that both the magnification deviation amounts RX and RY calculated in the detection image come "1" and then the image is formed. For example, as shown in part (a) of FIG. 8, correction such that the toner image is magnified (enlarged) in the X-direction by "1/RX time" and in the Y-direction by "1/RY time" on the basis of a gravitation center position of the rectangular region constituting the position reference points of the toner image is made by the image forming apparatus 100. That is, the image forming apparatus 100 forms the toner image by changing the magnification of the toner image of the background image master data [Dg] with use of a magnification deviation correction amount in subsequent image formation (re-printing of the image on the N-th sheet). By the control in this embodiment, relative to part (a) of FIG. 8, as shown in part (b) of FIG. 8, correction is made so that the toner image corrected in the movement deviation amount in the above-described manner coincides with the varnish image.

On the other hand, in the case where the varnish coater 200 is selected for correcting the movement deviation, correction for moving the varnish image in the X-direction by "-QX" and in the Y-direction by "-QY" is made by the varnish coater 200. The varnish coater 200 forms the varnish image by correcting the varnish image master data [Dv] with use of a movement deviation correction amount in subsequent image formation (re-printing of the image on the N-th sheet). Incidentally, even in the case where the varnish coater 200 is selected as the correcting means, as regards the magnification deviation, the toner image magnification of the background image master data [Dg] is changed with use of the magnification deviation amounts (1/RX time and 1/RY time), and then the toner image is formed by the image forming apparatus 100.

Returning to FIG. 4, in the case where the main controller 101 executes calculation of the correction amount (S11), the N-th recording material S (first recording material) subjected to image inspection is discharged on the NG tray 400*b* (S12). In this case, the main controller 101 discriminates that the positional deviation of the image occurs on the recording material S, and the processing returns to the processing of the step S2 without updating the counter "N". That is, the image formation of the image on the N-th recording material S subjected to the image inspection is carried out again (re-printing). Thus, in the case where the positional deviation occurs on the N-th sheet, the background image master data [Dg] and the varnish image master data [Dv] are corrected by the above-described movement deviation amount and the above-described magnification deviation amount, and the corrected background image master data [Dg] and the corrected varnish image master data [Dv] are applied to the image formation of the image on the N-th recording material S and subsequent image forming processes of the images on an (N+1)-th recording material S and later.

On the other hand, in the case where the positional deviation does not occur (No of S6), the main controller 101 discharges the N-th recording material S (second recording material) subjected to the image inspection onto the OK tray 400*a* (S7). Then, the main controller 101 discriminates whether there is a subsequent ((N+1)-th) recording material S subjected to continuous image formation and the image forming job is continued or there is no subsequent ((N+1)-th) recording material S subjected to the continuous image formation and the image forming job is ended (S8). In the case where the image forming job is ended (Yes of S8), the main controller 101 ends the "recording material output processing". In the case where the image forming job is not ended (No of S8), the main controller 101 counts up the counter "N" (S9), and the processing returns to the processing of the step S2.

As described above, in this embodiment, the positional deviation between the toner image and the varnish image is corrected on the basis of an inspection result of the toner image and the varnish image on the recording material S by the image inspection apparatus 400 and the image master data of the toner image and the varnish image which are formed on the recording material S. At that time, the magnification deviation (RX, RY) between the toner image and the varnish image read by the image inspection apparatus 400, the movement deviation (SgX, SgY) of the toner image read by the image inspection apparatus 400 relative to the toner image based on the background image master data, and the movement deviation (QX, QY) of the toner image read by the image inspection apparatus 400 relative to the varnish image read by the image inspection apparatus 400 are calculated. On the basis of these magnification deviation and movement deviation, only the background image master data or the background image master data and the varnish image master data are corrected, and the toner image and the varnish image are formed on the recording material S while the positional deviation of the toner image and the varnish image are automatically corrected during the image forming job. Thus, even in the case where the "magnification deviation" and the "movement deviation" simultaneously can occur when the toner image and the varnish image are formed on the recording material S, it is possible to prepare a recording material S on which the toner image and the varnish image do not cause such positional deviation.

Second Embodiment

Next, a second embodiment will be described using FIGS. 11 and 12. As described above, in the first embodiment, the toner image and the varnish image which are formed on the N-th recording material S are inspected, and correction of positional deviation of the images on the N-th sheet is made on the basis of detection image data of the toner image and the varnish image. Thereafter, the positional deviation amounts at that time are applied to image formation of the image on an (N+1)-th recording material S (see FIG. 4).

However, the toner image formed on the recording material S is capable of fluctuating in magnification with respect to the feeding direction so as to more contract with a larger toner coverage. For example, as shown in FIG. 11, in the case where the toner coverage is "0%", the toner image is hard to contract (magnification: "100%"), but the toner image is capable of contracting so as to be magnification of "99%" in the case where the toner coverage is "50%" and magnification of "98%" in the case where the toner coverage is "100%". This is because a rotational speed of the intermediary transfer belt 80 is made higher with the toner coverage closer to "100%" and becomes high relative to a feeding speed of the recording material S, and thus the toner image is formed on the recording material S so as to contract in the feeding direction. Incidentally, in this embodiment, the toner coverage refers to a proportion (areal ratio) of a toner application amount of the toner image formed on the recording material S in the case where the toner application amount of the toner image when the toner image is formed on entirety of, for example, an A4 sheet is taken as "100%".

For example, in the case where the toner coverage of the N-th sheet is "50%" or more and the toner coverage of the (N+1)-th sheet is less than "50%", the toner image can cause a magnification difference of "2%". Therefore, in the first embodiment, in the case where an image forming job such that image formation in which the toner coverage is "50%" (threshold) or more and image formation in which the toner coverage is less than "50%" are carried out continuously and alternately, there is a liability that the magnification deviation of "2%" repetitively occurs every (one) sheet of the recording material S. This is because a magnification deviation correction amount of "RY=100/98=102%", for example, when the toner coverage of the N-th sheet is "50%" or more is also applied to the image formation in which the toner coverage of the (N+1)th sheet is less than "50%".

Further, in the case where the number of times of fixing is different between the image formation of the N-th sheet and the image formation of the (N+1)-th sheet, the magnification difference is liable to occur between the magnification deviation of the N-th sheet and the magnification deviation of the (N+1)-th sheet. That is, in the case of double-side printing, after the toner image is fixed on a first (one) side of the recording material S, the toner image is fixed on a second (the other) side. That is, in the case of one-side printing, the recording material S passes through the fixing device 50 in the number of times of fixing of "one time", i.e., once, and in the case of the double-side printing, the recording material S passes through the fixing device 50 in the number of times of fixing of "two times", i.e., twice. In the case where the recording material S passes through the fixing device 50 twice, compared with the case where the recording material S passes through the fixing device 50 once, the recording material S can be more contracted by the influence of heating by the fixing device 50. Incidentally, pieces of information on the toner coverage, the one-side printing, and the double-side printing are included in the background image master data [Dg].

<Recording Material Output Processing>

In FIG. 12, recording material output processing in the second embodiment is shown. Incidentally, in the recording material output processing in the second embodiment, processes similar to the processes in the recording material output processing (see FIG. 4) in the first embodiment are represented by the same step numbers, and will be briefly described or omitted from description.

As shown in FIG. 12, every time when a single image forming job is started, the main controller 101 performs initialization such that an initial value "1" is set for a counter "N" for holding the number of sheets subjected to image formation during execution of the image forming job (S1). Then, the main controller 101 acquires the background image master data [Dg] and the varnish image master data [Dv], and acquires a background image forming condition C [N] from the background image master data [Dv] (S21). As the background image forming condition C [N], the main controller 101 acquires information on the toner coverage, the one-side printing, or the double-side printing. On the basis of the acquired background image forming condition C [N], the main controller 101 acquires a magnification correction value from a correction table shown in a table 1 (S22).

TABLE 1

| TONER COVERAGE | NTF*[1]: 1 | NTF*[1]: 2 |
|---|---|---|
| 50%≤ | MCV*[2]: 2% | MCV*[2]: 5% |
| ≤50% | MCV*[2]: 1% | MCV*[2]: 4% |

*[1]"NTF" is the number of times of fixing.
*[2]"MCV" is the magnification correction value.

As shown in the table 1, in the correction table, the magnification correction values are defined. In this embodiment, in the case where the toner coverage is "50% or more" and the number of times of fixing is "1", the magnification correction value of "2%" is defined. In the case where the toner coverage is "50% or more" and the number of times of fixing is "2", the magnification correction value of "5%" is defined. In the case where the toner coverage is "less than 50%" and the number of times of fixing is "1", the magnification correction value of "1%" is defined. In the case where the toner coverage is "less than 50%" and the number of times of fixing is "2", the magnification correction value of "4%" is defined. That is, the magnification correction value (second magnification correction value) in the case where the toner coverage is "less than 50%" is smaller than the magnification correction value (first magnification correction value) in the case where the toner coverage is "50% or more". Further, the magnification correction value (second magnification correction value) in the case where the number of times of fixing is "2" is larger than the magnification correction value (first magnification correction value) in the case where the number of times of fixing is "1".

Returning to description of FIG. 20, the main controller 101 causes the image forming apparatus 100 to form the toner image on N-th recording material S and causes the varnish coater 200 to form the varnish image on the N-th recording material S (S2). In the step 2 and later, the processes of the steps S3 to S9, S10, and S11 are the processes similar to the processes in the above-described first embodiment.

In the second embodiment, in the case where the positional deviation occurs on the N-th sheet (Yes of S6), the background image master data [Dg] and the varnish image master data [Dv] are corrected by the calculated movement deviation amount and the calculated magnification deviation amount, and the corrected background image master data [Dg] and the corrected varnish image master data [Dv] are applied to the image formation of the image on the N-th recording material S (re-printing).

However, in the second embodiment, in the case where the positional deviation occurs on the N-th recording material S (Yes of S6), the main controller 101 calculates the magnification deviation amounts between the background image master data and the varnish image master data (S23). The magnification deviation amounts TgX and TgY between the background image master data and the varnish image master data are calculated by formulas (9) and (10) shown below. Each of the magnification deviation amounts TgX and TgY as second magnification deviation corresponds to a ratio between a length of one side of a rectangular region constituting position reference points on the background image master data and a length of one side of a rectangular region constituting position reference points on the detection background image data (see part (b) of FIG. 5).

$$TgX=(xg4-xg1)/(x4-x1) \quad \text{formula (9)}$$

$$TgY=(yg4-yg1)/(y2-y1) \quad \text{formula (10)}$$

Then, the main controller 101 updates the correction table (table 1) on the basis of the calculated magnification deviation amounts between the background image master data and the detection background image data (S24). Thereafter, the main controller 101 discharges the N-th recording material S subjected to the image inspection onto the NG tray 400*b* (S12), and the processing returns to the processing of the step S2. For example, the correction magnification relative to the toner coverage is as shown in FIG. 11, but somewhat deviation can occur due to various conditions of the main assembly of the image forming apparatus 100. The main controller 101 acquires this deviation from a detection result by the image inspection apparatus 400 and changes the correction table to a correction table in which the acquired deviation is taken into consideration. For example, in the case where the magnification correction value which is assumed as "2%" at the toner coverage of "100%" was 1% in actuality, the main controller 101 updates the magnification correction value from "2%" to "1%".

In the case of the second embodiment, after the discharging of the step, i.e., in order to form the image on the (N+1)-th recording material S. Then, the main controller 101 acquires the information on the toner coverage of the toner image, the one-side printing, or the double-side printing from the background image master data [Dg] for forming the image on the (N+1)-th recording material S (S21). The main controller 101 acquires the magnification correction value from the correction table shown in the table 1 on the basis of the acquired information on the toner coverage, the one-side printing, or the double-side printing (S22). The main controller 101 causes the image forming apparatus 100 to form the toner image on the (N+1)-th recording material S (S2), but at that time, the magnification deviation amount calculated when the recording material S is the N-th recording material S is corrected by the magnification correction value acquired from the correction table. Then, in accordance with the magnification deviation amount after the correction, the toner image of the background image master data [Dg] is magnified and is subjected to the image formation.

As described above, in the second embodiment, by providing the correction table shown in the table 1, even in the case where the image forming job in which a magnitude of the magnification deviation between the toner image and the varnish image which are formed on the recording material S can change frequently, it is possible to prepare a recording material S with no positional deviation between the toner image and the varnish image while suppressing consumption of the recording material S.

Other Embodiments

Embodiments of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2022-125394 filed on Aug. 5, 2022, which is hereby incorporated by reference herein in its entirety.

What is claimed is:

1. An image forming system comprising:

an image forming apparatus configured to form a toner image on a first recording material on the basis of first image data for the toner image;

a fixing device configured to fix the toner image on the first recording material by applying heat and pressure to the first recording material on which the toner image is formed by the image forming apparatus;

a varnish image forming apparatus configured to form a varnish image on the first recording material, on which the toner image is fixed by the fixing device, on the basis of second image data for the varnish image;

an image reading portion configured to read the toner image and the varnish image which are formed on the first recording material; and a controller configured to control the image forming apparatus and the varnish image forming apparatus, wherein the controller corrects the first image data depending on first detection image data of the toner image read by the image reading portion, and then depending on the corrected first image data, a toner image is formed on a second recording material subsequent to the first recording material, wherein the controller corrects the second image data depending on second detection image data of the varnish image read by the image reading portion, and then depending on the corrected second image data, a varnish image is formed on the second recording material, wherein depending on the first image data and the first detection image data of the toner image read by the image reading portion, the controller acquires a first deviation amount on deviation in size occurring in the toner image formed on the first recording material and a second deviation amount on deviation in position occurring in the toner image formed on the first recording material, and corrects the first image data depending on the first deviation amount and the second deviation amount, and then depending on the corrected first image data, the toner image is formed on the second recording material, and wherein depending on the second image data and the second detection image data of the varnish image read by the image reading portion, the controller acquires a third deviation amount on deviation in position occurring in the varnish image formed on the first recording material, and corrects the second image data depending on the third deviation amount, and then depending on the corrected second image data, the varnish image is formed on the second recording material.

2. The image forming system according to claim 1, wherein the controller acquires a fourth deviation amount on deviation in position between the toner image and the varnish image which are formed on the first recording material, and in a case that the fourth deviation amount is greater than a threshold, the controller acquires the first deviation amount, the second deviation amount, and the third deviation amount.

3. An image forming system comprising:

an image forming apparatus configured to form a toner image on a first recording material on the basis of first image data for the toner image;

a fixing device configured to fix the toner image on the first recording material by applying heat and pressure to the first recording material on which the toner image is formed by the image forming apparatus;

a varnish image forming apparatus configured to form a varnish image on the first recording material, on which the toner image is fixed by the fixing device, on the basis of second image data for the varnish image;

an image reading portion configured to read the toner image and the varnish image which are formed on the first recording material;

a first tray and a second tray; and a controller configured to control the image forming apparatus and the varnish image forming apparatus, wherein the controller corrects the first image data depending on first detection image data of the toner image read by the image reading portion, and then depending on the corrected first image data, a toner image is formed on a second recording material subsequent to the first recording material, wherein the controller corrects the second image data depending on second detection image data of the varnish image read by the image reading portion, and then depending on the corrected second image data, a varnish image is formed on the second recording material, wherein in a case that the controller discriminates that deviation occurs between the toner image and the varnish image, which are formed on the first recording material, on the basis of the first detection image data and the second detection image data which are read by the image reading portion, the controller causes the first recording material to be discharged on the first tray, and wherein in a case that the controller discriminates that the deviation does not occur, the controller causes the first recording material to be discharged on the second tray.

4. The image forming system according to claim 1, wherein the varnish is UV varnish of an ultraviolet-curable type, and wherein the varnish image forming apparatus solidifies the UV varnish, ejected on the recording material, through irradiation of ultraviolet radiation.

5. An image forming system comprising:

an image forming apparatus configured to form a toner image on a first recording material on the basis of first image data for the toner image;

a fixing device configured to fix the toner image on the first recording material by applying heat and pressure to the first recording material on which the toner image is formed by the image forming apparatus;

a varnish image forming apparatus configured to form a varnish image on the first recording material, on which the toner image is fixed by the fixing device, on the basis of second image data for the varnish image;

an image reading portion configured to read the toner image and the varnish image which are formed on the first recording material; and a controller configured to control the image forming apparatus and the varnish image forming apparatus, wherein the controller corrects the first image data depending on first detection image data of the toner image read by the image reading portion and second detection image data of the varnish image read by the image reading portion, and then depending on the corrected first image data, a toner image is formed on a second recording material subsequent to the first recording material, wherein the varnish image is formed on the second recording material depending on the second image data, and wherein depending on the first image data, the first detection image data of the toner image read by the image reading portion, and the second detection image data of the varnish image read by the image reading portion, the controller acquires a first deviation amount on deviation in size occurring in the toner image formed on the first recording material, a second deviation amount on deviation in position occurring in the toner image formed on the first recording material, and a third deviation amount on deviation between the toner image and the varnish image which are formed on the first recording material, and corrects the first image data depending on the first deviation amount, the second deviation amount, and the third deviation amount, and then depending on the corrected first image data, the toner image is formed on the second recording material.

6. The image forming system according to claim 1, wherein the controller acquires the third deviation amount, and in a case that the third deviation amount is greater than a threshold, the controller acquires the first deviation amount and the second deviation amount.

7. An image forming system comprising:

an image forming apparatus configured to form a toner image on a first recording material on the basis of first image data for the toner image;

a fixing device configured to fix the toner image on the first recording material by applying heat and pressure to the first recording material on which the toner image is formed by the image forming apparatus;

a varnish image forming apparatus configured to form a varnish image on the first recording material, on which the toner image is fixed by the fixing device, on the basis of second image data for the varnish image;

an image reading portion configured to read the toner image and the varnish image which are formed on the first recording material;

a first tray and a second tray; and a controller configured to control the image forming apparatus and the varnish image forming apparatus, wherein the controller corrects the first image data depending on first detection image data of the toner image read by the image reading portion and second detection image data of the varnish image read by the image reading portion, and then depending on the corrected first image data, a toner image is formed on a second recording material subsequent to the first recording material, wherein the varnish image is formed on the second recording material depending on the second image data, wherein in a case that the controller discriminates that deviation occurs between the toner image and the varnish image, which are formed on the first recording material, on the basis of the first detection image data and the second detection image data which are read by the image reading portion, the controller causes the first recording material to be discharged on the first tray, and wherein in a case that the controller discriminates that the deviation does not occur, the controller causes the first recording material to be discharged on the second tray.

8. The image forming system according to claim 5, wherein the varnish is UV varnish of an ultraviolet-curable type, and wherein the varnish image forming apparatus solidifies the UV varnish, ejected on the recording material, through irradiation of ultraviolet radiation.

9. An image forming system comprising:

an image forming apparatus configured to form a toner image on a recording material on the basis of first image data for the toner image;

a fixing device configured to fix the toner image on the recording material by applying heat and pressure to the recording material on which the toner image is formed by the image forming apparatus;

a varnish image forming apparatus configured to form a varnish image on the recording material by ejecting varnish on the recording material, on which the toner image is fixed by the fixing device, on the basis of second image data for the varnish image;

an image reading portion configured to read the toner image and the varnish image which are formed on the recording material; and a calculating portion configured to calculate, on the recording material on which the toner image and the varnish image superposed on the toner image are formed, deviation in magnification between the toner image read by the image reading portion and the varnish image read by the image reading portion, first movement deviation which is a deviation amount between the toner image read by the image reading portion and the toner image based on the first image data, in at least one of a recording material feeding direction and a widthwise direction crossing the feeding direction, second movement deviation which is a deviation amount between the varnish image read by the image reading portion and the varnish image based on the second image data in at least one of the feeding direction and the widthwise direction, and third movement deviation which is a deviation amount between the toner image read by the image reading portion and the varnish image read by the image reading portion in at least one of the feeding direction and the widthwise direction; and a controller configured to control the image forming apparatus and the varnish image forming apparatus, wherein in a case that, on a first recording material on which the toner image based on the first image data and the varnish image based on the second image data are formed, the third movement deviation calculated by the calculating portion is greater than a predetermined first deviation amount and the deviation in magnification calculated by the calculating portion is greater than a predetermined second deviation amount, when the first movement deviation calculated by the calculating portion is greater than the second movement deviation, the controller corrects the first image data depending on the third movement deviation and a magnification deviation amount of the deviation in magnification, and then the toner image and the varnish image are formed on a second recording material different from the first recording material, and when the second movement deviation calculated by the calculating portion is greater than the first movement deviation, the controller corrects the second image data depending on the third movement deviation and corrects the first image data depending on the magnification deviation amount of the deviation in magnification, and then the toner image and the varnish image are formed on the second recording material.

10. The image forming system according to claim 9, further comprising a first tray and a second tray on each of which the recording material from which the toner image and the varnish image are read by the image reading portion is capable of being discharged, wherein in a case that the toner image and the varnish image are formed on the second recording material, the first recording material is discharged on the first tray, and the second recording material is discharged on the second tray when the toner image and the varnish image which are formed on the second recording material are read by the image reading portion and the first movement deviation, the second movement deviation, and the third movement deviation do not occur.

11. The image forming system according to claim 9, further comprising a storing portion configured to store a correction table in which a magnification correction value used for correcting the deviation in magnification is defined, wherein when the controller corrects the first image data depending on the magnification deviation amount of the deviation in magnification and then the toner image is formed on the second recording material different from the first recording material, in a case that an aerial ratio of the toner image is equal to or greater than a threshold, the controller corrects the first image data by a first magnification correction value of the correction table, and in a case that the aerial ratio of the toner image is less than the threshold, the controller corrects the first image data by a second magnification correction value less than the first magnification correction value.

12. The image forming system according to claim 9, further comprising a storing portion configured to store a correction table in which a magnification correction value used for correcting the deviation in magnification is defined, wherein when the controller corrects the first image data depending on the magnification deviation amount of the deviation in magnification and then the toner image is formed on the second recording material different from the first recording material, in a case of one-side printing in which an image is formed on one side of the recording material, the controller corrects the first image data in accordance with a first magnification correction value of the correction table, and in a case of double-side printing in which images are formed on both sides of the recording material, the controller corrects the first image data in accordance with a second magnification correction value, greater than the first magnification correction value, of the correction table.

13. The image forming system according to claim 11, wherein the calculating portion calculates second deviation in magnification between the toner image read by the image reading portion and the toner image based on the first image data, and wherein the controller updates the magnification correction value of the correction table on the basis of the second deviation in magnification calculated by the calculating portion.

14. The image forming system according to claim 9, wherein the varnish is UV varnish of an ultraviolet-curable type, and wherein the varnish image forming apparatus solidifies the UV varnish, ejected on the recording material, through irradiation of ultraviolet radiation.

* * * * *